(12) United States Patent
Ohtomo et al.

(10) Patent No.: US 9,932,719 B2
(45) Date of Patent: Apr. 3, 2018

(54) CONTROL SYSTEM FOR CONSTRUCTION MACHINE

(71) Applicant: TOPCON Corporation, Tokyo-to (JP)

(72) Inventors: Fumio Ohtomo, Saitama (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 0 days.

(21) Appl. No.: 15/620,929

(22) Filed: Jun. 13, 2017

(65) Prior Publication Data
US 2017/0356158 A1 Dec. 14, 2017

(30) Foreign Application Priority Data

Jun. 14, 2016 (JP) ................................ 2016-117754

(51) Int. Cl.
| | |
|---|---|
| *G06F 7/70* | (2006.01) |
| *G06F 19/00* | (2011.01) |
| *G06G 7/00* | (2006.01) |
| *E02F 3/43* | (2006.01) |
| *E02F 3/90* | (2006.01) |
| *G01S 3/783* | (2006.01) |
| *G01S 5/16* | (2006.01) |

(Continued)

(52) U.S. Cl.
CPC .............. *E02F 3/433* (2013.01); *E02F 3/907* (2013.01); *G01S 3/783* (2013.01); *E02F 9/2004* (2013.01); *G01S 5/163* (2013.01); *G05D 1/0236* (2013.01)

(58) Field of Classification Search
CPC ........ E02F 3/433; G01S 3/783; G05D 1/0236

USPC .......................................................... 701/50
See application file for complete search history.

(56) References Cited

U.S. PATENT DOCUMENTS 4,981,354 A * 1/1991 DeHainaut .............. G01S 3/783
250/203.1
5,025,377 A * 6/1991 Kamimura ........... G05D 1/0244
180/169

(Continued)

FOREIGN PATENT DOCUMENTS

| JP | 2004-212058 A | 7/2004 |
|---|---|---|
| JP | 2005-274229 A | 10/2005 |

(Continued)

*Primary Examiner* — Isaac G Smith
(74) *Attorney, Agent, or Firm* — Nields, Lemack & Frame, LLC

(57) ABSTRACT

The invention provides a control system for a construction machine comprises a construction machine and a measuring instrument, wherein the construction machine comprises at least two targets, a tilt detecting component, a driving unit, a machine control unit and a machine communication unit, wherein the measuring instrument comprises a distance measuring unit, an optical axis deflecting unit for deflecting the optical axes, a projecting direction detecting unit for detecting a deflection angle and a deflecting direction and a measurement control unit for determining a measuring point and transmitting a measurement result, wherein the measurement control unit allows the distance measuring unit to alternately measure the targets and calculates a direction and front-back and left-right tilts of the construction machine based on three-dimensional positions of the targets and a detection result of the tilt detecting component, and the machine control unit controls the driving unit based on a calculation result.

16 Claims, 5 Drawing Sheets

(51) Int. Cl.
    *G05D 1/02*         (2006.01)
    *E02F 9/20*         (2006.01)

(56) References Cited

U.S. PATENT DOCUMENTS

| | | | |
|---|---|---|---|
| 5,671,160 A * | 9/1997 | Julian | G01C 15/00 33/293 |
| 2004/0125365 A1 | 7/2004 | Ohtomo et al. | |
| 2005/0211882 A1 | 9/2005 | Ohtomo et al. | |
| 2006/0198700 A1 | 9/2006 | Maier et al. | |
| 2014/0074295 A1 | 3/2014 | Kumagai et al. | |
| 2014/0074361 A1 | 3/2014 | O'Connor et al. | |
| 2017/0138730 A1 | 5/2017 | Ohtomo et al. | |

FOREIGN PATENT DOCUMENTS

| | | |
|---|---|---|
| JP | 2008-531888 A | 8/2008 |
| JP | 2014-55499 A | 3/2014 |
| JP | 2014-55936 A | 3/2014 |
| JP | 2017-96629 A | 6/2017 |

\* cited by examiner

THE SAME DEFLECTION ANGLE

A AND A', B AND B' ARE ROTATED IN SYNCHRONIZATION

CONTROL SYSTEM FOR CONSTRUCTION MACHINE

BACKGROUND OF THE INVENTION

The present invention relates to a control system for a construction machine, which detects and controls a position and an attitude of a construction machine, e.g., a screed of a paver.

In a case where a position detection and an attitude detection of a screed of a paver are performed, targets such as omnidirectional prisms or the like are installed on left and right sides of the screed respectively, a distance measurement and an angle measurement to each target are performed by a measuring instrument, and a position, a roll angle (a tilt angle in a left-right direction), a yaw angle (an advancing direction) of the screed are detected. Further, a pitch angle (a tilt angle in a front-back direction) of the paver is detected by a tilt sensor provided in the paver, and a position and an attitude of the paver are calculated based on each detection result. Further, the screed is controlled based on the calculated position and attitude of the paver.

In the detection of an attitude of the paver and the detection of a position of the screed in the past, at least two measuring instruments, e.g., total stations must be used, and at least two prisms must be measured.

Since at least two total stations are required, in order to accurately grasp a positional relationship of the respective total stations, a machine setting of each total station must be accurately performed. For this reason, there has been a problem that a setup operation of each total station requires a time.

Further, since each total station must sight each different prism, it must be confirmed depending on a direction of the paver whether each total station sights a target prism, and hence a workability is poor.

It is to be noted that, as a control system of a construction machine using the total station as a measuring instrument, there is one disclosed in Japanese Patent Application Publication No. JP 2008-531888 A. Further, as a control system of a construction machine using an instrument which projects a rotary laser as a measuring instrument, there are one disclosed in Japanese Patent Application Publication No. JP 2014-55499 A and one disclosed in Japanese Patent Application Publication No. JP 2014-55936 A.

SUMMARY OF THE INVENTION

It is an object of the present invention to provide a control system for a construction machine, which can detect a plurality of targets with the use of one measuring instrument.

To attain the object as described above, a control system for a construction machine according to the present invention comprises a construction machine for performing a civil engineering work and a measuring instrument for measuring a position and an attitude of the construction machine, wherein the construction machine comprises at least two targets installed at positions as required on the construction machine, a tilt detecting component for detecting a tilt in a front-back direction, a driving unit for driving the construction machine, a machine control unit for controlling the driving unit and a machine communication unit capable of communicating with the measuring instrument, wherein the measuring instrument comprises a distance measuring unit for projecting a distance measuring light, receiving a reflected distance measuring light and performing a distance measurement, an optical axis deflecting unit provided in a common optical path of the distance measuring light and the reflected distance measuring light and for deflecting the optical axes of the distance measuring light and the reflected distance measuring light at the same deflecting angle in the same direction, a projecting direction detecting unit for detecting a deflection angle and a deflecting direction provided by the optical axis deflecting unit and a measurement control unit for determining a three-dimensional position of a measuring point based on a distance measurement result of the distance measuring unit and a detection result of the projecting direction detecting unit and transmitting a measurement result to the machine control unit, wherein the measurement control unit controls the optical axis deflecting unit, allows the distance measuring unit to alternately sight the targets and alternately measure the targets by time division and calculates a direction and front-back and left-right tilts of the construction machine based on three-dimensional positions of the targets and a detection result of the tilt detecting component, and the machine control unit controls the driving unit based on a calculation result of the measurement control unit.

Further, in the control system for a construction machine according to the present invention, the tilt detecting component is a tilt sensor provided on a body frame of the construction machine.

Further, in the control system for a construction machine according to the present invention, the targets are provided at three positions on the construction machine, the measuring instrument measures three-dimensional positions of the three targets, and the measurement control unit calculates a direction and front-back and left-right tilts of the construction machine based on the three-dimensional positions of the three targets.

Further, in the control system for a construction machine according to the present invention, the measuring instrument comprises a target detecting light projecting unit for projecting a target detecting light, a target detecting light receiving unit for receiving a reflected target detecting light, and a tracking unit for detecting and tracking the targets by receiving the reflected target detecting light, and the tracking unit allows the distance measuring unit to detect and sight the target of an object to be measured every time the target of the object to be measured is switched over.

Further, in the control system for a construction machine according to the present invention, the measuring instrument comprises a measuring instrument main body for accommodating the distance measuring unit, the optical axis deflecting unit, the projecting direction detecting unit and the measurement control unit, a support unit for supporting the measuring instrument main body to be rotatable in an up-and-down direction and in a left-right direction, a rotation driving unit for rotating the measuring instrument main body in the up-and-down direction and in the left-right direction and an angle detector for detecting an up-and-down angle and a left-right angle of the measuring instrument main body.

Further, in the control system for a construction machine according to the present invention, the optical axis deflecting unit has a distance measuring optical axis deflecting component which is formed at a central portion and defects a distance measuring light at an angle as required and in a direction as required, and a reflected distance measuring optical axis deflecting component which is formed at an outer circumferential portion and deflects a reflected distance measuring light at the same deflection angle in the same direction as the deflection angle and the direction of the distance measuring optical axis deflecting unit.

Further, in the control system for a construction machine according to the present invention, the optical axis deflecting unit is constituted of a pair of optical prisms designed in a disk-like shape which overlap one another, and each of the optical prisms is independently rotatable.

Further, in the control system for a construction machine according to the present invention, the optical prisms constituting the optical axis deflecting unit are a Fresnel prism.

Furthermore, the control system for a construction machine according to the present invention further comprises an image pickup unit having an image pickup optical axis which is parallel to an optical axis of a distance measuring light and has a known relation, wherein the image pickup unit is configured so that a deflection range of the distance measuring light deflected by the optical axis deflecting unit coincides or approximately coincides with a field angle of the image pickup unit.

According to the present invention, the control system for a construction machine comprises a construction machine for performing a civil engineering work and a measuring instrument for measuring a position and an attitude of the construction machine, wherein the construction machine comprises at least two targets installed at positions as required on the construction machine, a tilt detecting component for detecting a tilt in a front-back direction, a driving unit for driving the construction machine, a machine control unit for controlling the driving unit and a machine communication unit capable of communicating with the measuring instrument, wherein the measuring instrument comprises a distance measuring unit for projecting a distance measuring light, receiving a reflected distance measuring light and performing a distance measurement, an optical axis deflecting unit provided in a common optical path of the distance measuring light and the reflected distance measuring light and for deflecting the optical axes of the distance measuring light and the reflected distance measuring light at the same deflecting angle in the same direction, a projecting direction detecting unit for detecting a deflection angle and a deflecting direction provided by the optical axis deflecting unit and a measurement control unit for determining a three-dimensional position of a measuring point based on a distance measurement result of the distance measuring unit and a detection result of the projecting direction detecting unit and transmitting a measurement result to the machine control unit, wherein the measurement control unit controls the optical axis deflecting unit, allows the distance measuring unit to alternately sight the targets and alternately measure the targets by time division and calculates a direction and front-back and left-right tilts of the construction machine based on three-dimensional positions of the targets and a detection result of the tilt detecting component, and the machine control unit controls the driving unit based on a calculation result of the measurement control unit. As a result, the single measuring instrument can suffice for the plurality of targets, a reduction in a system cost can be achieved, and a decrease in time of a setup operation and an improvement in a workability can be achieved.

DETAILED DESCRIPTION OF THE PREFERRED EMBODIMENT

A description will be given below on an embodiment of the present invention by referring to the attached drawings.

Figure 1:
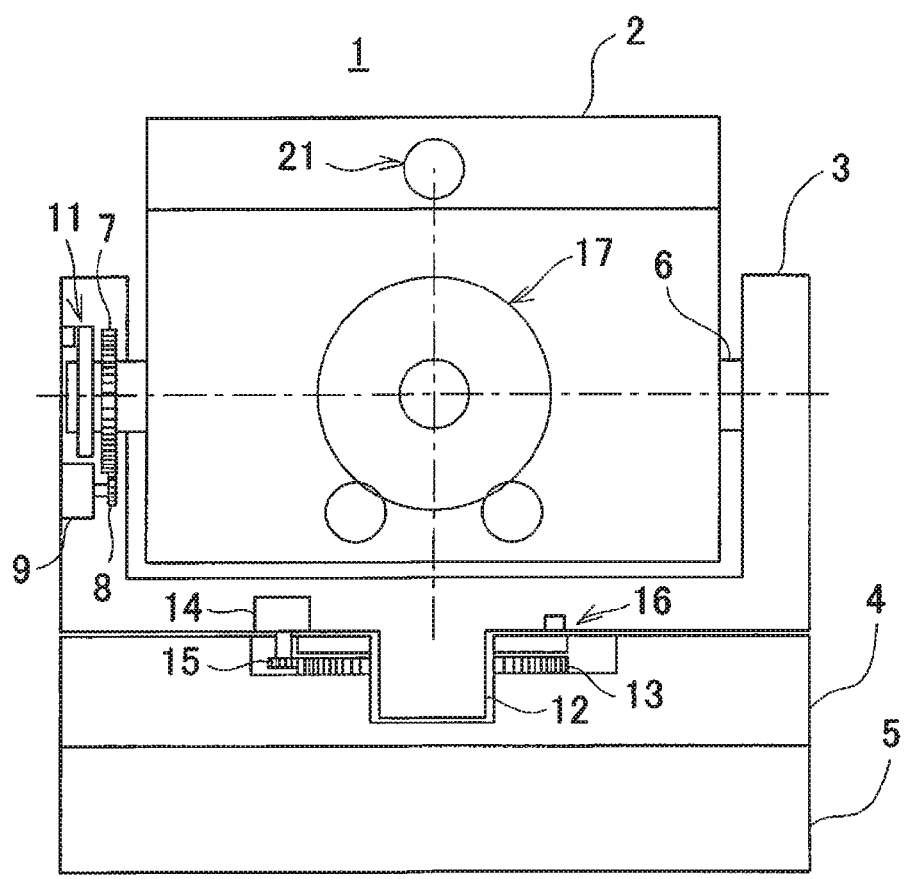
FIG. 1 is a front view showing a measuring instrument which is applied to a control system for a construction machine according to an embodiment of the present invention.
Figure 2:
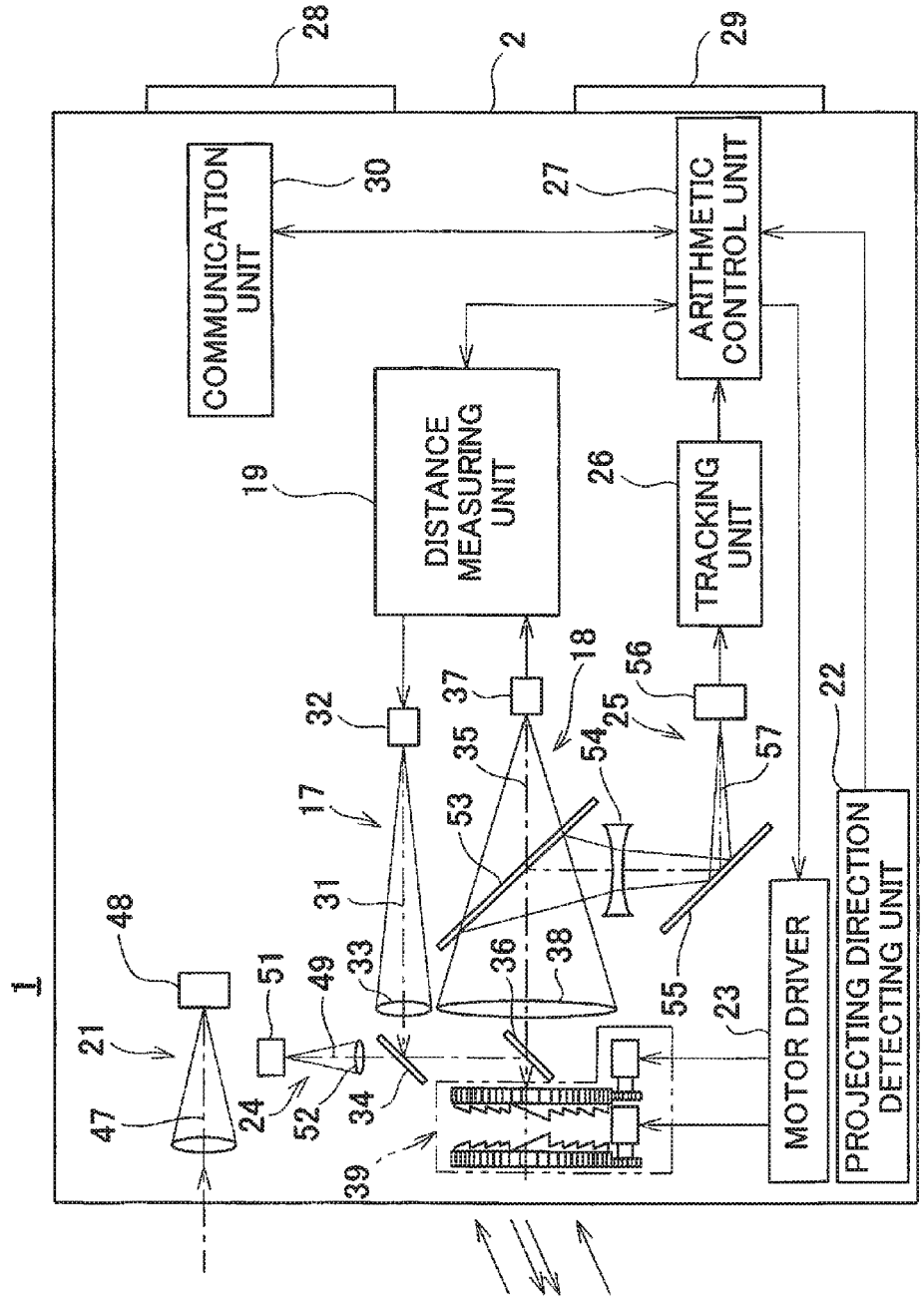
FIG. 2 is a schematical drawing showing an optical system of the measuring instrument.

First, a description will be given on a measuring instrument applied to a control system for a construction machine according to an embodiment of the present invention by referring to FIG. 1 and FIG. 2.

A measuring instrument 1 is, for instance, a total station having a tracking function, and is installed on a tripod (not shown). The measuring instrument 1 has a measuring instrument main body 2, a frame unit 3, a base unit 4 and a surveying base plate 5.

The frame unit 3 is designed in a recessed form having a recessed portion, and the measuring instrument main body 2 is accommodated in the recessed portion. The measuring instrument main body 2 is supported by the frame unit 3 via an up-and-down rotation shaft 6 and can freely rotate around the up-and-down rotation shaft 6 as the center in an up-and-down direction.

An up-and-down driven gear 7 is fitted on an end portion of the up-and-down rotation shaft 6. The up-and-down driven gear 7 meshes with an up-and-down driving gear 8, and the up-and-down driving gear 8 is fixed to an output shaft of an up-and-down driving motor 9. The measuring instrument main body 2 is configured to be rotated in an up-and-down direction by the up-and-down driving motor 9.

Further, an up-and-down rotation angle detector 11 (e.g., an encoder), which detects an up-and-down angle (an angle in a rotating direction around the up-and-down rotation shaft 6), is provided between the up-and-down rotation shaft 6 and the measuring instrument main body 2. A relative rotation angle of the measuring instrument main body 2 in the up-and-down direction with respect to the frame unit 3 is detected by the up-and-down rotation angle detector 11.

A left-right rotation shaft 12 is protruded from a lower surface of the frame unit 3, and the left-right rotation shaft 12 is rotatably fitted in the base unit 4 via a bearing (not shown). The frame unit 3 is rotatable around the left-right rotation shaft 12 as the center in a left-right direction.

A left-right driven gear 13 is fixed to the base unit 4 concentrically with the left-right rotation shaft 12. A left-right driving motor 14 is provided in the frame unit 3, and a left-right driving gear 15 is fixed to an output shaft of the left-right driving motor 14. The left-right driving gear 15 meshes with the left-right driven gear 13. The frame unit 3 is configured to rotate in a left-right direction by the left-right driving motor 14.

Further, a left-right rotation angle detector 16 (for instance, an encoder), which detects a left-right angle (an angle in a rotating direction around the left-right rotation shaft 12 as the center), is provided between the left-right rotation shaft 12 and the base unit 4. A relative rotation angle of the frame unit 3 in the left-right direction with respect to the base unit 4 is detected by the left-right rotation angle detector 16.

Further, the base unit 4 is provided on the surveying base plate 5, and the surveying base plate 5 is installed on a tripod (not shown). The surveying base plate 5 has an automatic leveling mechanism, and functions as a leveling unit which automatically levels the measuring instrument main body 2.

By cooperating the up-and-down driving motor 9 and the left-right driving motor 14, the measuring instrument main body 2 can be directed to a desired direction. It is to be noted that the frame unit 3 and the base unit 4 make up a support unit of the measuring instrument main body 2. Further, the up-and-down driving motor 9 and the left-right driving motor 14 make up a rotation driving unit of the measuring instrument main body 2.

A distance measuring light projecting unit 17, a light receiving unit 18, a distance measuring unit 19, an image pickup unit 21, a projecting direction detecting unit 22, a motor driver 23, a target detecting light projecting unit 24, a target detecting light receiving unit 25, a tracking unit 26, a communication unit 30 and an arithmetic control unit 27 which is a measurement control unit are accommodated and integrated in the measuring instrument main body 2. Further, an operation unit 28 and a display unit 29 are provided to the measuring instrument main body 2. It is to be noted that the display unit 29 may be designed as a touch panel and also may be served as the operation unit 28.

The distance measuring light projecting unit 17 has a projection optical axis 31, and a light emitting element 32, e.g. a laser diode (LD), is provided on the projection optical axis 31. Further, a projecting lens 33 is provided on the projection optical axis 31. Further, the projection optical axis 31 is deflected by a first reflecting mirror 34 as a deflecting optical component provided on the projection optical axis 31 and a second reflecting mirror 36 as a deflecting optical component provided on a light receiving optical axis 35 (to be described later) so as to coincide with the light receiving optical axis 35. It is to be noted that the first reflecting mirror 34 and the second reflecting mirror 36 make up a projection optical axis deflecting unit.

The first reflecting mirror 34 has a wavelength selecting function and is a beam splitter which has optical characteristics of, for instance, reflecting a distance measuring light and transmitting a target detecting light as described later.

The light receiving unit 18 has the light receiving optical axis 35, and a reflected distance measuring light enters the light receiving unit 18 from an object to be measured, for instance, a target with a retroreflective ability such as a prism or a reflecting mirror or the like.

A photodetector 37, for instance, a photodiode (PD) is provided on the light receiving optical axis 35, and further an image forming lens 38 is arranged on the light receiving optical axis 35. The image forming lens 38 focuses the reflected distance measuring light on the photodetector 37. The photodetector 37 receives the reflected distance measuring light, and produces a light receiving signal. The light receiving signal is input to the distance measuring unit 19.

Figure 3:
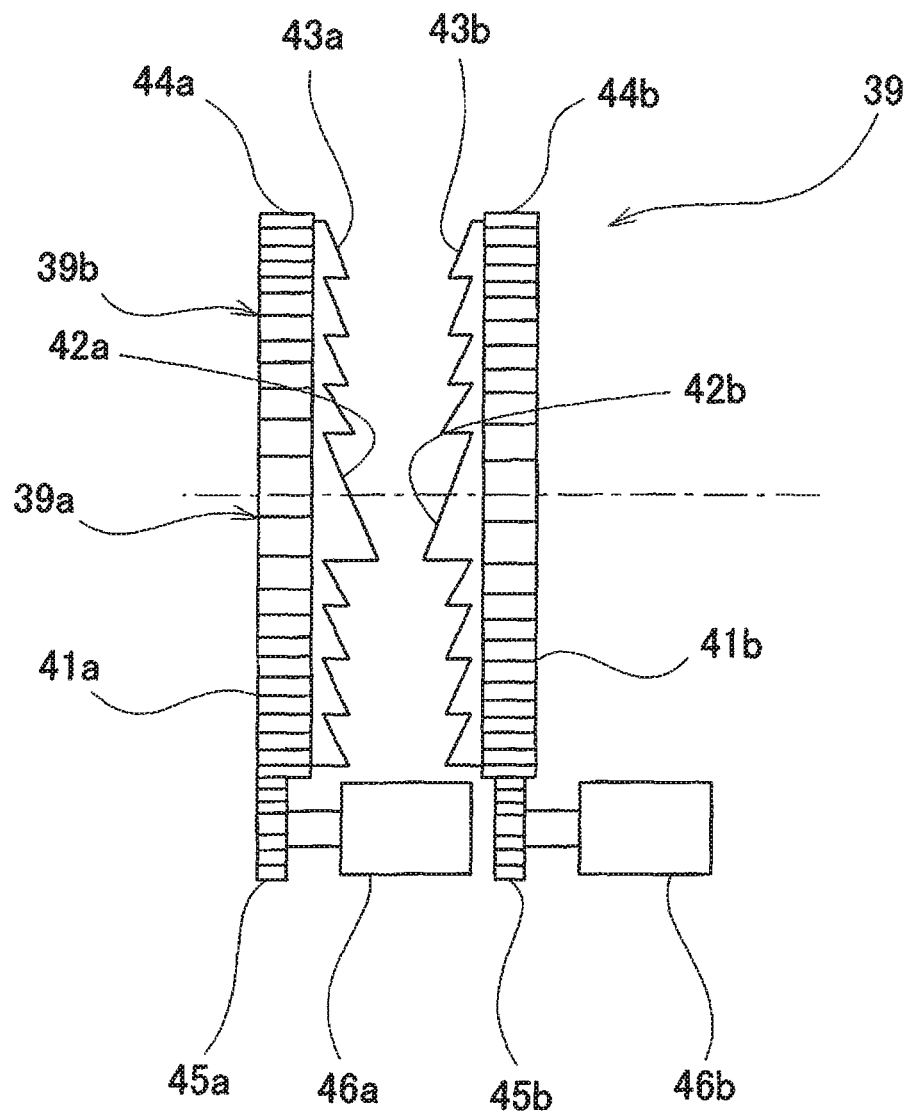
FIG. 3 is an enlarged view of an optical axis deflecting unit in the optical system.

Further, on the light receiving optical axis 35 (i.e., the projection optical axis 31), an optical axis deflecting unit 39 is arranged on an object side of the image forming lens 38. A description will be given below on the optical axis deflecting unit 39 by referring to FIG. 3.

The optical axis deflecting unit 39 is constituted of a pair of optical prisms 41a and 41b. The optical prisms 41a and 41b are designed in a disk-like shape respectively and disposed perpendicularly crossing the light receiving optical axis 35 on the light receiving optical axis 35, and the optical prisms 41a and 41b overlap one another and are arranged in parallel to each other. As for the optical prisms 41a and 41b, a Fresnel prism is preferably used respectively in order to reduce a size of the instrument.

A central part of the optical axis deflecting unit 39 is designed as a distance measuring optical axis deflecting component 39a which is a first optical axis deflecting unit which the distance measuring light passes through, and a portion of the optical axis deflecting unit 39 except the central part is designed as a reflected distance measuring optical axis deflecting component 39b which is a second optical axis deflecting unit which the reflected distance measuring light passes through.

The Fresnel prisms used as the optical prisms 41a and 41b are constituted of prism elements 42a and 42b and many prism elements 43a and 43b which are formed in parallel to each other respectively, and have a plate shape. Each of prism elements 42a and 42b and the prism elements 43a and 43b have the same optical characteristics, respectively.

The prism elements 42a and 42b constitute the distance measuring optical axis deflecting component 39a, and the prism elements 43a and 43b constitute the reflected distance measuring optical axis deflecting component 39b.

The Fresnel prism may be manufactured by an optical glass, or the Fresnel prism may be molded by using an optical plastic material. By molding the Fresnel prism by using the optical plastic material, a low cost Fresnel prism can be manufactured.

The optical prisms 41a and 41b are arranged in such a manner that the optical prisms 41a and 41b can independently and individually rotate with the light receiving optical axis 35 as the center, respectively. By individually controlling rotating directions, rotation amounts and rotating speeds, the optical prisms 41a and 41b deflect the projection optical axis 31 of the distance measuring light as emitted in an arbitrary direction, and deflect the light receiving optical axis 35 of the reflected distance measuring light as received in parallel to the projection optical axis 31.

An outer shape of each of the optical prisms 41a and 41b is designed as a circle shape with the light receiving optical axis 35 at the center. Taking an expansion of the reflected distance measuring light into consideration, diameters of the optical prisms 41a and 41b are set so that a sufficient light amount can be obtained.

A ring gear 44a is fitted with an outer periphery of the optical prism 41a, and a ring gear 44b is fitted with an outer periphery of the optical prism 41b.

A driving gear 45a meshes with the ring gear 44a, and the driving gear 45a is fixed to an output shaft of a motor 46a. Similarly, a driving gear 45b meshes with the ring gear 44b, and the driving gear 45b is fixed to an output shaft of a motor 46b. The motors 46a and 46b are electrically connected to the motor driver 23.

As the motors 46a and 46b, a motor which can detect a rotation angle or a motor which rotates corresponding to a driving input value, e.g., a pulse motor is used. Alternatively, by using a rotation angle detector which detects a rotation amount (the rotation angle) of the motor, e.g., an encoder or the like, the rotation amount of the motor may be detected. The rotation amounts of the motors 46a and 46b are detected respectively, and the motors 46a and 46b are individually controlled by the motor driver 23.

The driving gears 45a and 45b and the motors 46a and 46b are provided at positions not interfering with the distance measuring light projecting unit 17, for instance, on a lower side of the ring gears 44a and 44b.

It is to be noted that the projecting lens 33, the distance measuring optical axis deflecting component 39a, or the like make up a light projecting optical system, and the reflected distance measuring optical axis deflecting component 39*b*, the image forming lens 38, or the like make up a light receiving optical system.

The distance measuring unit 19 controls the light emitting element 32, and makes the light emitting element 32 to emit a laser beam as a distance measuring light. The projection optical axis 31 is deflected by the prism elements 42*a* and 42*b* (the distance measuring optical axis deflecting component 39*a*) so that the distance measuring light is directed toward the measuring point.

A reflected distance measuring light as reflected from an object to be measured enters the light receiving unit 18 through the prism elements 43*a* and 43*b* (the reflected distance measuring optical axis deflecting component 39*b*) and the image forming lens 38, and is received by the photodetector 37. The photodetector 37 sends a light receiving signal to the distance measuring unit 19, and the distance measuring unit 19 performs a distance measurement of a measuring point (a point irradiated with the distance measuring light) based on the light receiving signal from the photodetector 37.

The image pickup unit 21 is a camera which has a field angle of, e.g., 50° and acquires image data including the object to be measured. The image pickup unit 21 has an image pickup optical axis 47 which extends in the horizontal direction when the measuring instrument main body 2 is in a horizontal position, and the image pickup optical axis 47 and the projection optical axis 31 are set so as to be parallel. Further, a distance between the image pickup optical axis 47 and the projection optical axis 31 is also a known value.

An image pickup element 48 of the image pickup unit 21 is a CCD or a CMOS sensor which is an aggregate of pixels, and it is so arranged that a position of each pixel on an image element can be specified. For example, a position of each pixel in a coordinate system having the image pickup optical axis 47 as an origin point is specified.

The projecting direction detecting unit 22 counts driving pulses input to the motors 46*a* and 46*b* and detects rotation angles of the motors 46*a* and 46*b*. Alternatively, the projecting direction detecting unit 22 detects the rotation angles of the motors 46*a* and 46*b* based on a signal from an encoder. Further, the projecting direction detecting unit 22 calculates rotational positions of the optical prisms 41*a* and 41*b* based on the rotation angles of the motors 46*a* and 46*b*. Further, the projecting direction detecting unit 22 calculates a deflection angle and a projecting direction of the distance measuring light based on refractive indexes and the rotational positions of the optical prisms 41*a* and 41*b*, and calculation results are input to the arithmetic control unit 27.

Further, the target detecting light projecting unit 24 has a target detecting optical axis 49, and a light emitting element 51, e.g., a laser diode (LD), which emits the target detecting light with a wavelength different from a wavelength of the distance measuring light, is provided on the target detecting optical axis 49. Further, a projecting lens 52 is provided on the target detecting optical axis 49. Further, the first reflecting mirror 34 as a deflecting optical component is provided on the target detecting optical axis 49. It is to be noted that an emission of the target detecting light by the light emitting element 51 is controlled by the tracking unit 26.

The target detecting light as transmitted through the first reflecting mirror 34 coincides with the projection optical axis 31 as deflected by the first reflecting mirror 34. Further, when the target detecting light is reflected by the second reflecting mirror 36, the target detecting light coincides with the light receiving optical axis 35 (i.e., the projection optical axis 31).

Further, the target detecting light receiving unit 25 has a third reflecting mirror 53 which is a deflecting optical component and has a wavelength selecting function, a condenser lens 54, a fourth reflecting mirror 55 as a deflecting optical component and a target detecting light receiving element 56.

The third reflecting mirror 53 is provided on the light receiving optical axis 35 and has optical characteristics which reflect a reflected target detecting light and transmit a reflected distance measuring light with a different wavelength therethrough. Further, the target detecting light receiving unit 25 has a target detecting light receiving optical axis 57 as branched from the light receiving optical axis 35 by the third reflecting mirror 53, and the fourth reflecting mirror 55 and the target detecting light receiving element 56 are provided on the target detecting light receiving optical axis 57. Further, the condenser lens 54 is arranged between the third reflecting mirror 53 and the fourth reflecting mirror 55.

In a case where a detection and a tracking of a target are performed, a reflecting mirror with a retroreflective ability as the object to be measured, e.g., a prism is used. The reflected target detecting light as reflected by the prism (not shown) is transmitted through the optical axis deflecting unit 39, reflected by the third reflecting mirror 53, condensed by the condenser lens 54, deflected onto the target detecting light receiving optical axis 57 by the fourth reflecting mirror 55 and received by the target detecting light receiving element 56. The target detecting light receiving element 56 is a CCD or a CMOS sensor which is an aggregate of pixels, and it is so arranged that a position of each pixel on an image element can be specified. The target detecting light receiving element 56 receives the reflected target detecting light, and produces a light receiving signal based on a light receiving on the target detecting light receiving element 56. The light receiving signal is input to the tracking unit 26.

The tracking unit 26 detects a prism based on a light receiving of the reflected target detecting light on the target detecting light receiving element 56, and calculates a difference between a center of the target detecting light receiving element 56 and a position of the prism. A calculation result is input to the arithmetic control unit 27.

The communication unit 30 is configured to transmit or receive a measurement result or data to or from a machine control unit 66 of a paver 61 as described later.

The arithmetic control unit 27 comprises an input/output control unit, an arithmetic unit (CPU), a storage unit, or the like. In the storage unit, various types of programs are stored. These programs include: a distance measuring program for controlling a distance measuring operation, a detecting program for detecting a target as described later, a tracking program for controlling a tracking operation, a control program for allowing the motor driver 23 to control driving of the motors 46*a* and 46*b*, a control program for controlling driving of the up-and-down driving motor 9 and the left-right driving motor 14, a directional angle calculation program for calculating a directional angle (a horizontal angle, a vertical angle) of the projection optical axis 31 based on a calculation result of the projecting direction of the distance measuring light from the projecting direction detecting unit 22 and the detection results of the up-and-down rotation angle detector 11 and the left-right rotation angle detector 16, an image display program for displaying image data, distance measurement data, or the like on the display unit 29, and other programs. Further, the storage unit stores the measurement results such as the distance measurement data, the image data.

Figure 4A:
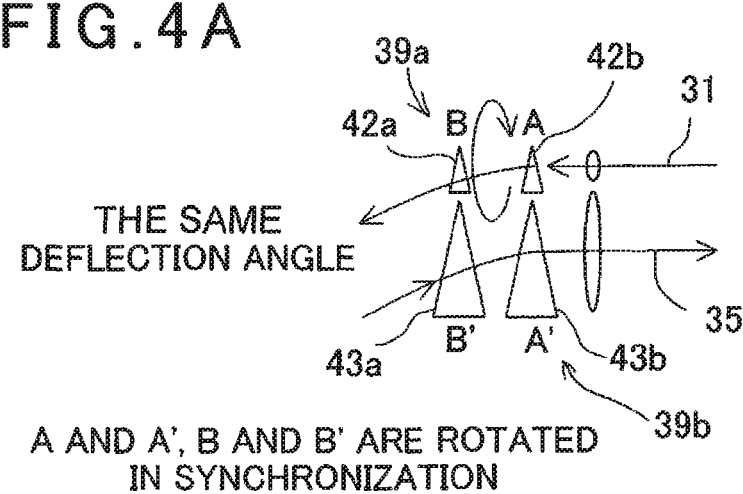
FIG. 4A, FIG. 4B and FIG. 4C are explanatory drawings showing an action of an optical axis deflecting unit.

Next, a description will be given on a measuring operation by the measuring instrument 1 by referring to FIG. 4A and FIG. 4B. It is to be noted that, in order to simplify the description, FIG. 4A shows that the prism elements 42a and 42b are separated from the prism elements 43a and 43b in the optical prisms 41a and 41b, respectively. Further, the prism elements 42a and 42b and the prism elements 43a and 43b as shown in FIG. 4A are in a state where a maximum deflection angle can be obtained. Further, a minimum deflection angle corresponds to a position where any one of the optical prisms 41a and 41b is rotated by 180°, the deflection angle becomes 0°, and an optical axis of a laser beam (the distance measuring light) to be projected becomes parallel to the projection optical axis 31. The prism elements 42a and 42b are so designed that the object to be measured or a measurement target area is scanned by the distance measuring light within a range of, e.g., ±20°.

A distance measuring light is emitted from the light emitting element 32, and the distance measuring light is turned to a parallel luminous flux by the projecting lens 33 and is projected toward an object to be measured or a measurement target area through the distance measuring optical axis deflecting component 39a (the prism elements 42a and 42b). Here, by passing through the distance measuring optical axis deflecting component 39a, the distance measuring light is deflected in a direction as required by the prism elements 42a and 42b and is projected.

A reflected distance measuring light as reflected by the object to be measured or the measurement target area is entered through the reflected distance measuring optical axis deflecting component 39b (the prism elements 43a and 43b) and is focused on the photodetector 37 by the image forming lens 38.

When the reflected distance measuring light passes through the reflected distance measuring optical axis deflecting component 39b, an optical axis of the reflected distance measuring light is deflected by the prism elements 43a and 43b so as to coincide with the light receiving optical axis 35 (FIG. 4A).

Further, by combination of a rotational position of the optical prism 41a and a rotational position of the optical prism 41b, the distance measuring light to be projected can be deflected in an arbitrary deflecting direction and at an arbitrary deflection angle.

Further, in a state where a positional relation between the optical prism 41a and the optical prism 41b is fixed (in a state where a deflection angle obtained by the optical prism 41a and the optical prism 41b is fixed), when the optical prism 41a and the optical prism 41b are integrally rotated by the motors 46a and 46b, a locus drawn by the distance measuring light passing through the distance measuring optical axis deflecting component 39a becomes a circle with the projection optical axis 31 as the center.

Therefore, when the optical axis deflecting unit 39 is rotated while emitting a laser beam (a distance measuring light) from the light emitting element 32, the distance measuring light can be scanned by the circular locus.

It is to be noted that the reflected distance measuring optical axis deflecting component 39b rotates integrally with the distance measuring optical axis deflecting component 39a as a matter of course.

Figure 4B:
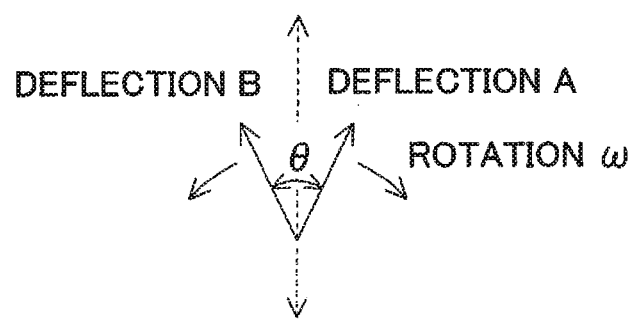

Next, FIG. 4B shows a case where the optical prism 41a and the optical prism 41b are relatively rotated. Assuming that a deflecting direction of the optical axis as deflected by the optical prism 41a is a deflection "A" and a deflecting direction of the optical axis as deflected by the optical prism 41b is a deflection "B", the deflection of the optical axes by the optical prisms 41a and 41b becomes a synthetic deflection "C" as an angle difference θ between the optical prisms 41a and 41b.

Therefore, every time an angle difference θ is changed, the optical axis deflecting unit 39 is rotated by one rotation, the projection is performed per every rotation, and the distance measuring light can be scanned linearly. Further, every time the angle difference θ is changed, by rotating the optical axis deflecting unit 39 in a state where the distance measuring light is projected, the distance measuring light can be scanned in a concentric and multi-circular form. Further, when the optical prism 41a and the optical prism 41b are rotated in the opposite directions at the same speed, the distance measuring light can be linearly scanned in a direction of the synthetic deflection C.

Figure 4C:
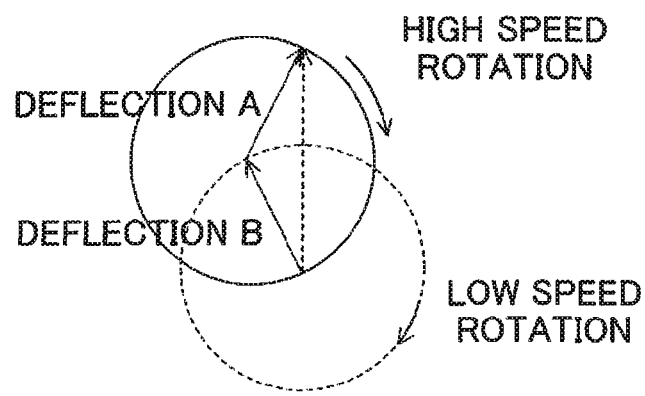

Further, as shown in FIG. 4C, when the optical prism 41b is rotated at a rotating speed lower than a rotating speed of the optical prism 41a, since the distance measuring light is rotated while the angle difference θ gradually increases, and the scanning locus of the distance measuring light has a spiral form.

Furthermore, by individually controlling the rotating directions and the rotating speeds of the optical prism 41a and the optical prism 41b, the various scanning states, e.g., a scanning state where the scanning locus of the distance measuring light is formed in a radial direction (scanning in a radial direction) with the projection optical axis 31 as the center, or in the horizontal direction, or in the vertical direction, or the like can be obtained.

As a measurement mode, by performing a distance measurement in condition where the optical axis deflecting unit 39 is fixed per each deflection angle as required, the distance measurements of specific measuring points can be performed. Further, by executing the distance measurement while changing the deflection angle of the optical axis deflecting unit 39, that is, by executing the distance measurement while scanning the distance measuring light, distance measurement data with respect to measuring points on the scanning locus can be obtained.

A projection directional angle of each distance measuring light can be detected based on the rotation angles of the motors 46a and 46b and the detection results of the up-and-down rotation angle detector 11 and the left-right rotation angle detector 16, and by associating the projection directional angle with the distance measurement data, three-dimensional distance measurement data can be acquired.

Further, as described above, the measuring instrument 1 includes the image pickup unit 21, and an image as acquired by the image pickup unit 21 is displayed on the display unit 29.

Here, a field angle of the image pickup unit 21 is, e.g., 500, a deflection range as provided by the optical prisms 41a and 41b is, e.g., ±20°, and hence a measurement range of the distance measuring unit 19 is approximately equal to an image pickup range of the image pickup unit 21. Therefore, a measuring operator can easily visually specify the measurement range and can search for the object to be measured or select the object to be measured from an image as displayed on the display unit 29, and hence the measuring operator does not have to sight the object to be measured.

It is to be noted that the field angle of the image pickup unit 21 and the deflection range provided by the optical prisms 41a and 41b are not restricted to the field angle and the deflection range as described above and, for example, it may be so arranged that the measurement range of the distance measuring unit 19 completely coincides with the image pickup range of the image pickup unit 21.

When the object to be measured is selected, the optical prisms 41a and 41b are rotated in such a manner that the distance measuring light is deflected toward the object to be measured. It is to be noted that, in a case where the object to be measured is present outside the image pickup range of the image pickup unit 21, the up-and-down driving motor 9 and the left-right driving motor 14 are driven so that the object to be measured is positioned within the image pickup range of the image pickup unit 21.

Since the projection optical axis 31 is parallel to the image pickup optical axis 47 and both the optical axes have a known relation, the arithmetic control unit 27 allows an image center to coincide with the projection optical axis 31 on an image as acquired by the image pickup unit 21. Further, by detecting the projection directional angle of the distance measuring light, the arithmetic control unit 27 can specify a measuring point on the image based on the projection directional angle. Therefore, an association of the three-dimensional distance measurement data of the measuring point with the image as acquired by the image pickup unit 21 can be easily performed, and the image as acquired by the image pickup unit 21 can turn to the image with the three-dimensional data.

Further, the measuring instrument 1 includes the tracking unit 26. The target detecting light is emitted from the light emitting element 51, and the target detecting light is turned to a parallel luminous flux by the projecting lens 52 and projected toward the object to be measured, for instance, a target with a retroreflective ability such as a prism or a reflecting mirror or the like through the distance measuring optical axis deflecting component 39a (the prism elements 42a and 42b). Here, by transmitting the distance measuring optical axis deflecting component 39a, the target detecting light is deflected to a direction as required by the prism elements 42a and 42b and projected.

The reflected target detecting light as reflected by the target enters through the reflected distance measuring optical axis deflecting component 39b (the prism elements 43a and 43b) and is focused on the target detecting light receiving element 56 by the image forming lens 38, the third reflecting mirror 53, the condenser lens 54 and the fourth reflecting mirror 55.

The tracking unit 26 detects the target based on a light receiving of the reflected target detecting light on the target detecting light receiving element 56, and calculates a difference between a center of the target detecting light receiving element 56 and a position of the target. A calculation result is input to the arithmetic control unit 27.

The arithmetic control unit 27 controls driving of the motors 46a and 46b based on the calculation result in the tracking unit 26. The arithmetic control unit 27 rotates the optical prisms 41a and 41b and rotates the measuring instrument main body 2 in the up-and-down direction and the left-right direction so that the reflected target detecting light from the target is received at the center of the target detecting light receiving element 56. Consequently, the measuring instrument main body 2 allows only the distance measuring light to follow the movements of the target in a stationary state and the target is tracked.

It is to be noted that, in a case where the target exceeds a tracking range of the optical axis deflecting unit 39, the up-and-down driving motor 9 and the left-right driving motor 14 are driven, and the measuring instrument main body 2 is rotated so as to direct toward the target as a matter of course.

Next, in FIG. 5, a description will be given on a case where the measuring instrument 1 is applied to a control system for a construction machine, for instance, a paver which paves with a concrete or an asphalt.

Figure 5:
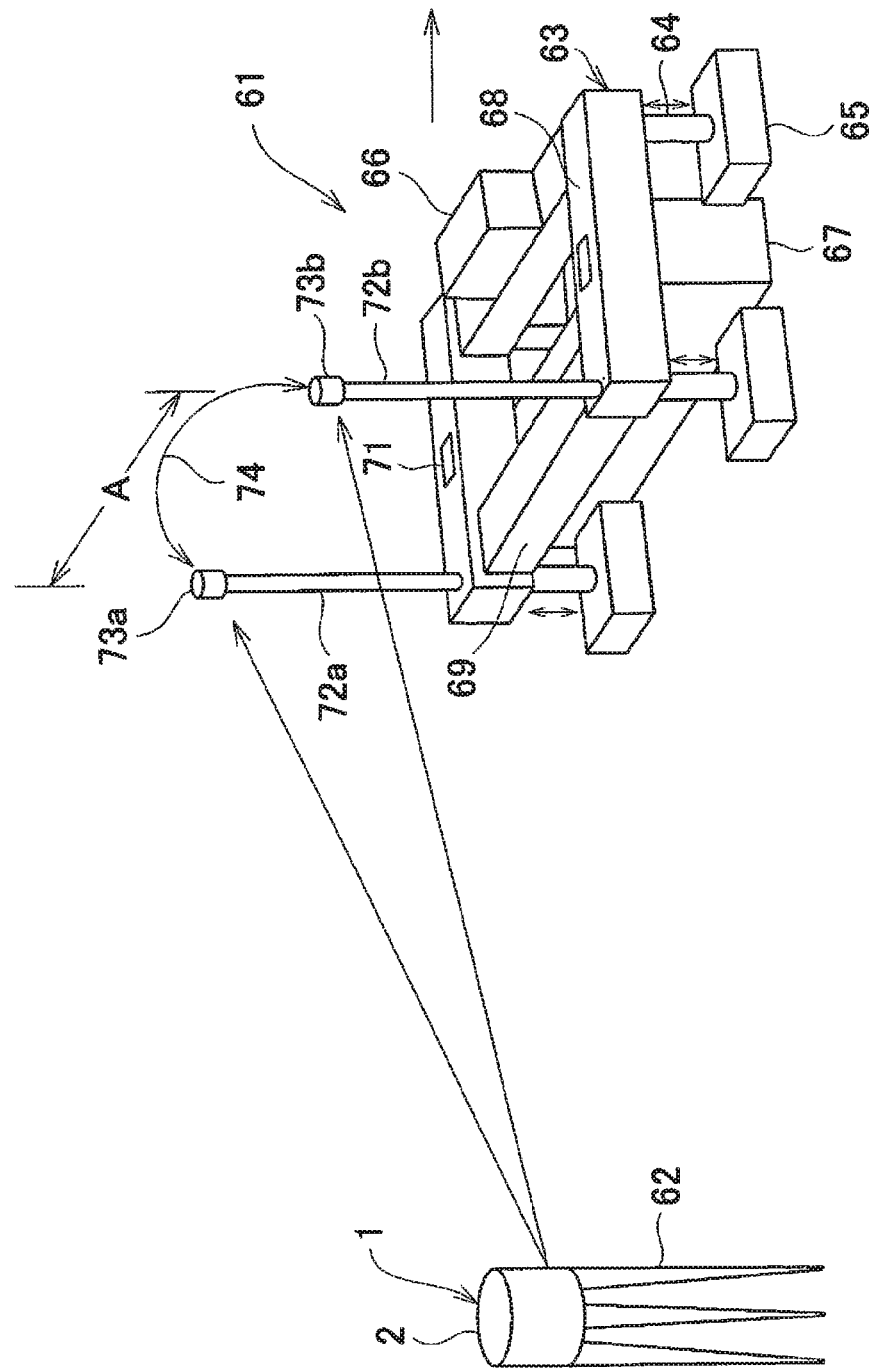
FIG. 5 is a schematical explanatory drawing of a control system for a construction machine according to an embodiment of the present invention.

In FIG. 5, a reference numeral 61 denotes a paver. Further, the measuring instrument 1 is installed at a known point via a tripod 62.

A construction range of the paver 61 is set so that the paver 61 can operate within a light receiving range of the distance measuring light and the target detecting light as emitted from the measuring instrument 1 and also within a range where the measurement can be performed with a predetermined accuracy by the measuring instrument 1. Further, the paver 61 has a body frame 63 designed in a well curb shape (a rectangular form), traveling apparatuses 65 provided at four corners of the body frame 63 via the leg unit 64 which can expand and contract in an up-and-down direction and the machine control unit 66 provided on the body frame 63.

As the traveling apparatus 65, for example, a crawler-type traveling apparatus is used, and the traveling apparatuses 65 can be individually controlled by the machine control unit 66.

On a lower surface at a center of the body frame 63, a screed 67 is provided. The screed 67 performs with high accuracy a series of processes, i.e., storing a mixed and kneaded concrete or the like, and further compacting and molding while placing concrete. A height control of the screed 67, i.e., a height control of a concrete placing surface is mainly performed by controlling the expansion and contraction of the leg unit 64. The screed 67 and the traveling apparatuses 65 function as a working mechanical unit of the paver 61, and the working mechanical unit is controlled by the machine control unit 66.

The leg unit 64, the traveling apparatuses 65 and the screed 67 make up a driving unit for driving the paver 61.

Further, the body frame 63 is constituted of two longitudinal beams 68 extending in parallel with an advancing direction and two lateral beams 69 orthogonal to the longitudinal beams 68, and the lateral beams 69 are expanded or contracted in accordance with a construction environment.

On an upper surface of the longitudinal beams 68, a tilt sensor 71 is provided as a tilt detecting component. The tilt sensor 71 detects a tilt in a front-back direction (a tilt in the advancing direction with respect to the horizontality) of the body frame 63, and a detection result is transmitted to the machine control unit 66. Further, the machine control unit 66 transmits the detection result of the tilt sensor 71 to the measuring instrument 1 through a machine communication unit (not shown).

At two spots at required positions of the body frame 63, or preferably at two corners of the upper surfaces of the longitudinal beams 68 on the back side of the advancing direction, pillars 72a and 72b are erected, respectively. On upper ends of the pillars 72a and 72b, targets 73a and 73b with the retroreflective ability such as the reflecting mirrors or the prisms or the like are provided, respectively.

It is to be noted that the erecting positions of pillars 72a and 72b only need to be known, and are not restricted to the two corners on the back side. Further, the heights of the targets 73a and 73b with respect to a machine reference position (e.g., an installation center of the screed 67) are also known. Further, a straight line connecting the targets 73a and 73b with each other is set so as to be orthogonal to the advancing direction of the paver 61, and a distance A between the targets 73a and 73b is also known.

The measuring instrument 1 alternately detects the targets 73a and 73b, and alternately measures three-dimensional positions of the targets 73a and 73b. The measuring instrument 1 can determine a direction (or an attitude) (a yaw angle) of the paver 61 with respect to the advancing direction, a tilt with respect to the advancing direction (a pitch angle, hereinafter referred as a tilt in the front-back direction), a tilt in direction orthogonal to the advancing direction (a roll angle, hereinafter referred as a tilt in the left-right direction) based on a measurement result (the distance measurement, the horizontal angles, the vertical angles) of the targets 73a and 73b, and a detection result of the tilt sensor 71 as received from the machine control unit 66.

Further, the measuring instrument 1 determines a machine reference position of the paver 61 based on the distance measurement results of the targets 73a and 73b, the direction (or the attitude) of the paver 61, the left-right tilt, the front-back tilt and the three-dimensional positions of the targets 73a and 73b.

Further, the measuring instrument transmits the measurement results, for instance, the direction (or the attitude) of the paver 61, the tilts in the front-back and left-right directions, the three-dimensional positions of the targets 73a and 73b, the machine reference position of the paver 61, or the like to the machine control unit 66 by the communication unit 30. The machine control unit 66 controls the leg unit 64, the traveling apparatuses 65, the screed 67, or the like in a state as required at a timing as required based on the information as received, and controls the operations so that the paver 61 carries out a construction work in a state as required.

Next, a description will be given on an action of a control system for the paver 61 using the measuring instrument 1.

In the present embodiment, the measuring instrument main body 2 allows the distance measuring unit 19 to alternately sight every time the targets 73a and 73b are switched over by using a deflecting action of the optical axis deflecting unit 39, and the targets 73a and 73b are alternately measured.

Here, each of a deflection from the target 73a to the target 73b and a deflection from the target 73b to the target 73a can be realized in an arbitrary route by the cooperation of the optical prisms 41a and 41b, but a pattern of a route is set in advance. For example, when a relation of the optical prisms 41a and 41b is fixed (namely, a deflection angle provided by the optical axis deflecting unit 39 is fixed) and the optical prisms 41a and 41b are integrally rotated, an arc-like locus 74 having a twofold deflection angle as a central angle can be obtained.

When a deflecting motion between the target 73a and the target 73b is set so as to be executed by the arc-like locus 74, after setting the deflection angle provided by the optical axis deflecting unit 39, just integrally rotating the optical prisms 41a and 41b can suffice, and hence the control will be simplified.

After the measuring instrument main body 2 is directed toward the paver 61 so that the targets 73a and 73b can be present within an image pickup range of the image pickup unit 21, one target, e.g., the target 73a is sighted by the measuring instrument 1. The optical axis deflecting unit 39 can deflect an optical axis in a range of ±20°, and the targets 73a and 73b can be captured in a deflection range of the optical axis deflecting unit 39 in a normal construction environment of the paver 61.

When the target 73a is sighted, the measuring instrument 1 performs the distance measurement and the angle measurement of the target 73a, and measures a three-dimensional position of the target 73a.

The arithmetic control unit 27 calculates a deflection angle from the target 73a to the target 73b with reference to the measuring instrument main body 2 based on a measurement result of the target 73a and a distance A between the target 73a and the target 73b, and also calculates a deflecting direction.

Based on the deflection angle and deflecting direction as calculated, the optical prisms 41a and 41b are rotated respectively, and the projection optical axis 31 is deflected to the target 73b. At this time, it is desirable to store the rotating directions and the rotation amounts of the optical prisms 41a and 41b in a storage unit of the arithmetic control unit 27.

A range where the distance measurement is possible is, e.g., 1.5° and, in a case where the target 73b is in the range where the distance measurement is possible in a state where the projection optical axis 31 is directed toward the target 73b, a three-dimensional position of the target 73b can be immediately measured. Further, in a case where the target 73b is not in the range where the distance measurement is possible, the optical prisms 41a and 41b are rotated respectively so that a light receiving position of the target detecting light on the target detecting light receiving element 56 is moved to a center of the target detecting light receiving element 56, and the detection of the target 73b is performed.

In a case where the target 73b is within a light receiving range of the target detecting light receiving element 56, a deviation from a center of the target detecting light receiving element 56 is obtained based on the light receiving of the reflected target detecting light on the target detecting light receiving element 56, and the optical prisms 41a and 41b are rotated respectively so that the deviation becomes 0, and the sighting is performed.

After the measurement of the target 73b, based on the three-dimensional positions of the targets 73a and 73b and the tilt angle of the body frame 63 in the front-back direction as received from the machine control unit 66, the arithmetic control unit 27 calculates a direction (or an attitude) and the tilts in the front-back and left-right directions of the paver 61. Further, the arithmetic control unit 27 calculates a machine reference position of the paver 61 based on the direction (or the attitude) and the tilts in the front-back and left-right directions of the paver 61, and transmits to the machine control unit 66 by the communication unit 30.

Further, after the measurement of the target 73b, the optical prisms 41a and 41b are integrally rotated for the same rotation amounts in a direction opposite to the direction at the time of the measurement of the target 73b based on the stored rotating directions and rotation amounts, and the target 73a is detected again. It is to be noted that the measurement is immediately performed in a case where the target 73a is in the range where the distance measurement is possible or the sighting is performed similarly to the measurement of the target 73b in a case where the target 73a is not in the range where the distance measurement is possible.

When the target 73a is sighted, the measuring instrument 1 performs a measurement of a three-dimensional position of the target 73a. Based on the three-dimensional position of the target 73a, the three-dimensional position of the target 73b as previously measured and the tilt of the body frame 63 in the front-back direction as received from the machine control unit 66, the arithmetic control unit 27 calculates the direction (or the attitude) and the tilts in the front-back and left-right directions of the paver 61 and the machine reference position. Further, the arithmetic control unit 27 transmits the calculation results to the machine control unit 66.

Similarly, the measurement of the targets 73a and 73b are sequentially repeated, namely, the targets 73a and 73b are alternately measured by time division, and the calculation results provided by the arithmetic control unit 27 are sequentially transmitted to the machine control unit 66. It is to be noted that, since the optical prisms 41a and 41b are small in size and light weight, the optical prisms 41a and 41b can rotate at a high speed and enable measuring both the targets 73a and 73b in an approximately real time. The machine control unit 66 controls the leg unit 64, the traveling apparatuses 65 and the screed 67 based on the direction (or the attitude) and the tilts in the front-back and left-right directions of the paver 61 and the machine reference position which are received from the measuring instrument 1.

The alternate measurement of the targets 73a and 73b as described above is constantly continuously performed during an operation performed by the paver 61, and the machine control unit 66 is capable of controlling the paver 61 in a real time based on the direction (or the attitude) and the tilts in the front-back and left-right directions of the paver 61 and based on the machine reference position which are calculated from the measurement results of the targets 73a and 73b and the tilt of the body frame 63 in the front-back direction.

As described above, in the present embodiment, after the three-dimensional position of the one target 73a is measured, at the time of sighting the other target 73b, just rotating the optical prisms 41a and 41b, which are small in size and light weight, can suffice.

Therefore, at the time of sighting the other target 73b, it is not necessary to drive the up-and-down driving motor 9 and the left-right driving motor 14 and to rotate the measuring instrument main body 2, and a detection of the targets 73a and 73b can be performed at a high speed in the range of ±20° with respect to the projection optical axis 31 with approximate no time lag.

Further, since the measuring instrument 1 can switch over the targets to be measured and alternately sight and detect the targets 73a and 73b at a high speed, the single measuring instrument 1 can suffice with respect to the two targets 73a and 73b, and a system cost of the control system for the paver 61 can be reduced.

Further, when the number of the measuring instrument 1 to be used is one, a facility cost can be suppressed, and also it is no longer necessary to grasp a mutual positional relation at a time when a plurality of measuring instruments are used conventionally, and a reduction in a time of a setup operation and an improvement in a workability can be achieved.

Further, since the sighting and the measuring of the targets 73a and 73b are performed by the single measuring instrument 1, it is not necessary to confirm whether or not which the measuring instrument 1 sights the target to be measured, and the workability can be improved.

It is to be noted that, in a case where each of the targets 73a and 73b is not present in the range of ±20° which is a deflection range of each of the optical prisms 41a and 41b, for example, in a case where a distance between the measuring instrument 1 and the paver 61 is short or the like, by the cooperation of the rotation of optical prisms 41a and 41b and the driving of the up-and-down driving motor 9, the left-right driving motor 14, it is possible to sight the targets 73a and 73b. In this case, likewise, as compared with a case where each of the targets 73a and 73b is sighted by using the up-and-down driving motor 9 and the left-right driving motor 14 alone, a great reduction in a time can be achieved.

Further, in addition to the targets 73a and 73b, a target 73c (not shown) may be additionally provided to the lateral beam 69 which is provided on the back side in the advancing direction. In this case, likewise, the measurement is performed by time division in the order of the targets 73a, 73b and 73c, the targets 73a, 73b and 73c, . . . . When the three points are measured with respect to the paver 61, a tilt in the front-back direction can be measured as well. In this case, since the three targets 73a, 73b and 73c and the measuring instrument 1 also function as a tilt detecting component, the tilt sensor 71 can be omitted.

It is to be noted that the description has been given with respect to the control system which controls the paver 61 with the use of the measuring instrument 1 in the present embodiment, and the control system can be applied to any other construction machine such as a bulldozer or the like as a matter of course.

The invention claimed is:

1. A control system for a construction machine comprising: a construction machine for performing a civil engineering work and a measuring instrument for measuring a position and an attitude of said construction machine,
wherein said construction machine comprises at least two targets installed at positions as required on said construction machine, a tilt detecting component for detecting a tilt in a front-back direction, a driving unit for driving said construction machine, a machine control unit for controlling said driving unit and a machine communication unit capable of communicating with said measuring instrument,
wherein said measuring instrument comprises a distance measuring unit for projecting a distance measuring light, receiving a reflected distance measuring light and performing a distance measurement, an optical axis deflecting unit provided in a common optical path of the distance measuring light and the reflected distance measuring light and for deflecting the optical axes of the distance measuring light and the reflected distance measuring light at the same deflecting angle in the same direction, a projecting direction detecting unit for detecting a deflection angle and a deflecting direction provided by said optical axis deflecting unit and a measurement control unit for determining a three-dimensional position of a measuring point based on a distance measurement result of said distance measuring unit and a detection result of said projecting direction detecting unit and transmitting a measurement result to said machine control unit, wherein said measurement control unit controls said optical axis deflecting unit, allows said distance measuring unit to alternately sight said targets and alternately measure said targets by time division and calculates a direction and front-back and left-right tilts of said construction machine based on three-dimensional positions of said targets and a detection result of said tilt detecting component, and said machine control unit controls said driving unit based on a calculation result of said measurement control unit.

2. The control system for a construction machine according to claim 1, wherein said tilt detecting component is a tilt sensor provided on a body frame of said construction machine.

3. The control system for a construction machine according to claim 1, wherein said targets are provided at three positions on said construction machine, said measuring instrument measures three-dimensional positions of said three targets, and said measurement control unit calculates a direction and front-back and left-right tilts of said construction machine based on said three-dimensional positions of said three targets.

4. The control system for a construction machine according to claim 1, wherein said measuring instrument comprises a target detecting light projecting unit for projecting a target detecting light, a target detecting light receiving unit for receiving a reflected target detecting light, and a tracking unit for detecting and tracking said targets by receiving the reflected target detecting light, and said tracking unit allows said distance measuring unit to detect and sight said target of an object to be measured every time said target of the object to be measured is switched over.

5. The control system for a construction machine according to claim 1, wherein said measuring instrument comprises a measuring instrument main body for accommodating said distance measuring unit, said optical axis deflecting unit, said projecting direction detecting unit and said measurement control unit, a support unit for supporting said measuring instrument main body to be rotatable in an up-and-down direction and in a left-right direction, a rotation driving unit for rotating said measuring instrument main body in the up-and-down direction and in the left-right direction and an angle detector for detecting an up-and-down angle and a left-right angle of said measuring instrument main body.

6. The control system for a construction machine according to claim 1, wherein said optical axis deflecting unit has a distance measuring optical axis deflecting component which is formed at a central portion and deflects a distance measuring light at an angle as required and in a direction as required, and a reflected distance measuring optical axis deflecting component which is formed at an outer circumferential portion and deflects a reflected distance measuring light at the same deflection angle in the same direction as the deflection angle and the direction of said distance measuring optical axis deflecting unit.

7. The control system for a construction machine according to claim 6, wherein said optical axis deflecting unit is constituted of a pair of optical prisms designed in a disk-like shape which overlap one another, and each of said optical prisms is independently rotatable.

8. The control system for a construction machine according to claim 7, wherein said optical prisms constituting said optical axis deflecting unit are a Fresnel prism.

9. The control system for a construction machine according to claim 1, further comprising an image pickup unit having an image pickup optical axis which is parallel to an optical axis of a distance measuring light and has a known relation, wherein said image pickup unit is configured so that a deflection range of the distance measuring light deflected by said optical axis deflecting unit coincides or approximately coincides with a field angle of said image pickup unit.

10. The control system for a construction machine according to claim 4, wherein said measuring instrument comprises a measuring instrument main body for accommodating said distance measuring unit, said optical axis deflecting unit, said projecting direction detecting unit and said measurement control unit, a support unit for supporting said measuring instrument main body to be rotatable in an up-and-down direction and in a left-right direction, a rotation driving unit for rotating said measuring instrument main body in the up-and-down direction and in the left-right direction and an angle detector for detecting an up-and-down angle and a left-right angle of said measuring instrument main body.

11. The control system for a construction machine according to claim 5, wherein said optical axis deflecting unit has a distance measuring optical axis deflecting component which is formed at a central portion and deflects a distance measuring light at an angle as required and in a direction as required, and a reflected distance measuring optical axis deflecting component which is formed at an outer circumferential portion and deflects a reflected distance measuring light at the same deflection angle in the same direction as the deflection angle and the direction of said distance measuring optical axis deflecting unit.

12. The control system for a construction machine according to claim 10, wherein said optical axis deflecting unit has a distance measuring optical axis deflecting component which is formed at a central portion and deflects a distance measuring light at an angle as required and in a direction as required, and a reflected distance measuring optical axis deflecting component which is formed at an outer circumferential portion and deflects a reflected distance measuring light at the same deflection angle in the same direction as the deflection angle and the direction of said distance measuring optical axis deflecting unit.

13. The control system for a construction machine according to claim 11, wherein said optical axis deflecting unit is constituted of a pair of optical prisms designed in a disk-like shape which overlap one another, and each of said optical prisms is independently rotatable.

14. The control system for a construction machine according to claim 12, wherein said optical axis deflecting unit is constituted of a pair of optical prisms designed in a disk-like shape which overlap one another, and each of said optical prisms is independently rotatable.

15. The control system for a construction machine according to claim 13, wherein said optical prisms constituting said optical axis deflecting unit are a Fresnel prism.

16. The control system for a construction machine according to claim 14, wherein said optical prisms constituting said optical axis deflecting unit are a Fresnel prism.

* * * * *